(12) United States Patent
Kato et al.

(10) Patent No.: US 7,321,694 B2
(45) Date of Patent: Jan. 22, 2008

(54) IMAGE FORMING APPARATUS AND IMAGE FORMING METHOD

(75) Inventors: Nobuyuki Kato, Sunto-gun (JP); Masami Taoda, Fuchu (JP); Ryo Yoshida, Tagata-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 840 days.

(21) Appl. No.: 10/804,113

(22) Filed: Mar. 19, 2004

(65) Prior Publication Data

US 2005/0206946 A1 Sep. 22, 2005

(51) Int. Cl.
G06K 9/36 (2006.01)
G06K 9/46 (2006.01)

(52) U.S. Cl. .............. 382/232; 382/233; 382/239; 382/245; 382/246; 382/247; 358/1.9; 358/1.13; 358/1.12; 358/1.16

(58) Field of Classification Search .......... 382/232, 382/233, 239, 252, 245, 246, 247, 248, 251; 358/1.1, 1.9, 1.13, 1.12, 1.15, 1.16, 1.18, 358/505
See application file for complete search history.

(56) References Cited

U.S. PATENT DOCUMENTS 6,266,449 B1* 7/2001 Ohsawa ............... 382/239
6,804,020 B1* 10/2004 Kuroda ............... 358/1.15
2001/0022664 A1* 9/2001 Tsuchiya ............ 358/1.12
2003/0025938 A1* 2/2003 Iida .................. 358/1.15

FOREIGN PATENT DOCUMENTS

JP 6-303440 A 10/1994

* cited by examiner

Primary Examiner—Matthew C. Bella
Assistant Examiner—Ali Bayat
(74) Attorney, Agent, or Firm—Foley & Lardner LLP

(57) ABSTRACT

An image forming apparatus having a reading unit which reads image information on an original, a first compression unit which compresses the image information into compressed image information, a first encoding unit which encodes the compressed image information, an interface unit which acquires printing information in a page description language from exterior, a generating unit which generates printing image information on the basis of the printing information, a second compression unit which compresses the printing image information into compressed printing image information, a second encoding unit which encodes the compressed printing image information, a decoding expansion unit which decodes and expands the encoded compressed image information and the encoded compressed printing image information, and a forming unit which forms an image onto a recording medium on the basis of the image information and the printing image information which have been decoded and expanded.

13 Claims, 6 Drawing Sheets

IMAGE FORMING APPARATUS AND IMAGE FORMING METHOD

BACKGROUND OF THE INVENTION

Recently, there exist digital multifunction devices having a copying function, a printer function, a facsimile function, and the like. In such a digital multifunction device, there are two or more areas generating image data. For example, at the time of copying, an image is inputted from a scanner of the device itself. Further, at the time of printing, an image described in a page description language is transmitted via an external interface from a personal computer at the exterior. The multifunction device develops the page description language into image data at the interior thereof. The image data is temporarily stored in a storage device in the multifunction device, for example, a hard disk or the like. At the time of printing, the image data is read out of the hard disk, and printed.

Accompanying a rise in the need for improved data security in recent years, among the digital multifunction devices, a multifunction device which encodes and stores image data has appeared. In Jpn. Pat. Appln. KOKAI Publication No. 6-303440, there is disclosed a copier with an encoding function, and there has been shown a technique in which image information of a document or a drawing to stored is stored in a storage means, and at that time, the image information is encoded in order to improve the security, and is decoded at the time of using thereof.

However, with respect to the multifunction devices in which image data is encoded and handled, for example, there can be considered a multifunction device in which both of image information from a scanner and a page description language (PDL) from a personal computer connected thereto are handled, and when the both compete with one another, there is the problem that a sufficient processing speed cannot be obtained because one processing is delayed if the other processing is given priority.

BRIEF SUMMARY OF THE INVENTION

One embodiment of the image forming apparatus is an image forming apparatus having a reading unit which reads image information on an original, a first compression unit which compresses the image information read by the reading unit into compressed image information, a first encoding unit which encodes the compressed image information, an interface unit which acquires printing information in a page description language from the exterior, a generating unit which generates printing image information on the basis of the printing information, a second compression unit which compresses the printing image information into compressed printing image information, a second encoding unit which encodes the compressed printing image information, a decoding expansion unit which decodes and expands the encoded compressed image information and compressed printing image information, and a forming unit which forms an image onto a recording medium on the basis of the image information and the printing image information which have been decoded and expanded by the decoding expansion unit.

DETAILED DESCRIPTION OF THE INVENTION

Hereinafter, an image forming apparatus such as a multifunction digital copier will be described in detail with reference to the drawings.

<Image Forming Apparatus>

(Electrical Configuration)

Figure 1:
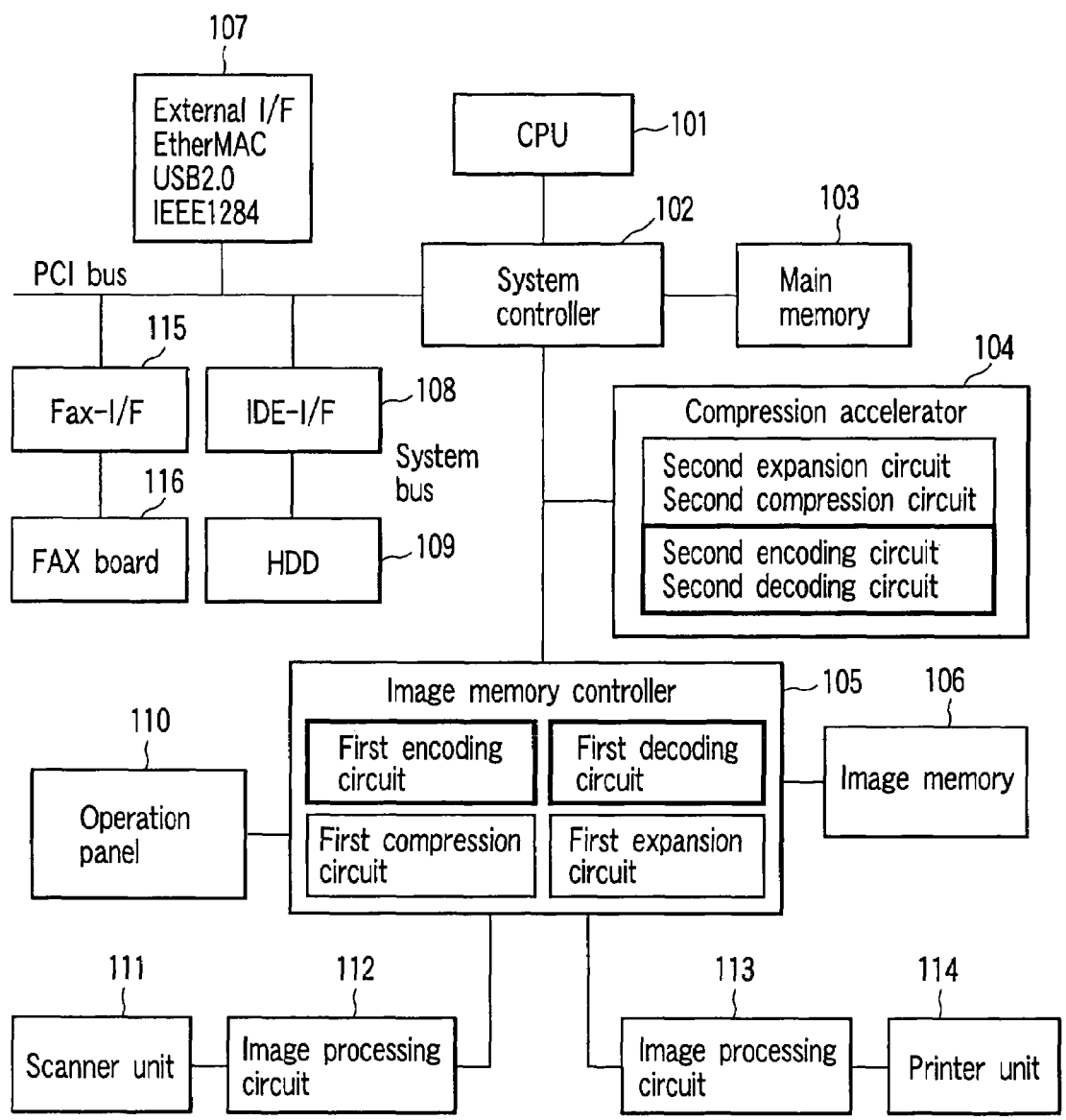
FIG. 1 is a block diagram showing one example of an electrical configuration of an image forming apparatus.

First, an electrical configuration of the image forming apparatus will be described with reference to the drawings. FIG. 1 is a block diagram showing one example of the electrical configuration of the image forming apparatus. The image forming apparatus has a CPU 101 and a system controller 102 which are a control unit, a main memory 103 connected thereto by a data bus, and a compression accelerator 104 for handling printing image information based on a page description language (PDL). The compression accelerator 104 includes at least a second expansion circuit, a second compression circuit, a second encoding circuit, and a second decoding circuit. Further, an external I/F 107 such as Ether, MAC, USB2.0, and IEEE1284, a FAX-I/F 115, a FAX board 116, an IDE-I/F 108, and an HDD 109 are connected via a PCI bus to the system controller 102.

Further, the image forming apparatus has an operation panel 110 connected to a system bus, for overall operational control, a scanner unit 111 for reading an original image, and an image processing circuit 112 connected thereto, for carrying out image processing of the read image, an image memory controller 105 for handling the original image information read from the scanner unit 111, an image memory 106 connected thereto, an image processing circuit 113 for carrying out image processing on the image information from the image memory controller 105, and a printer unit 114 for carrying out image formation on the basis of the image information from the image processing circuit 113. In addition, the image memory controller 105 includes at least a first encoding circuit, a first decoding circuit, a first compression circuit, and a first expansion circuit.

Here, it is preferable from the standpoint of improving the security that the image memory controller 105 including at least the first encoding circuit, the first decoding circuit, the first compression circuit, and the first expansion circuit is provided so as to be integrated in one LSI chip. In the same way, it is preferable from the standpoint of improving the security that the compression accelerator 104 including at least the second expansion circuit, the second compression circuit, the second encoding circuit, and the second decoding circuit is provided so as to be integrated in one LSI chip. However, the present invention is not limited thereto.

Further, it is preferable that the image memory controller 105 and the compression accelerator 104 respectively have functions of controlling memories such as the image memory 106, and the main memory 103. However, the present invention is not limited thereto.

Because the image forming apparatus has such an electrical configuration, a copying system image produced by a scanner, and a printer system image provided in PDL or the like can be processed in encoding circuits, or the like, respectively independent of one another. Therefore, even when a copying operation and a a printing operation are simultaneously requested, data can be encoded and stored in a hard disk without an increase in processing time being brought about.

(Mechanical Configuration)

Figure 2:
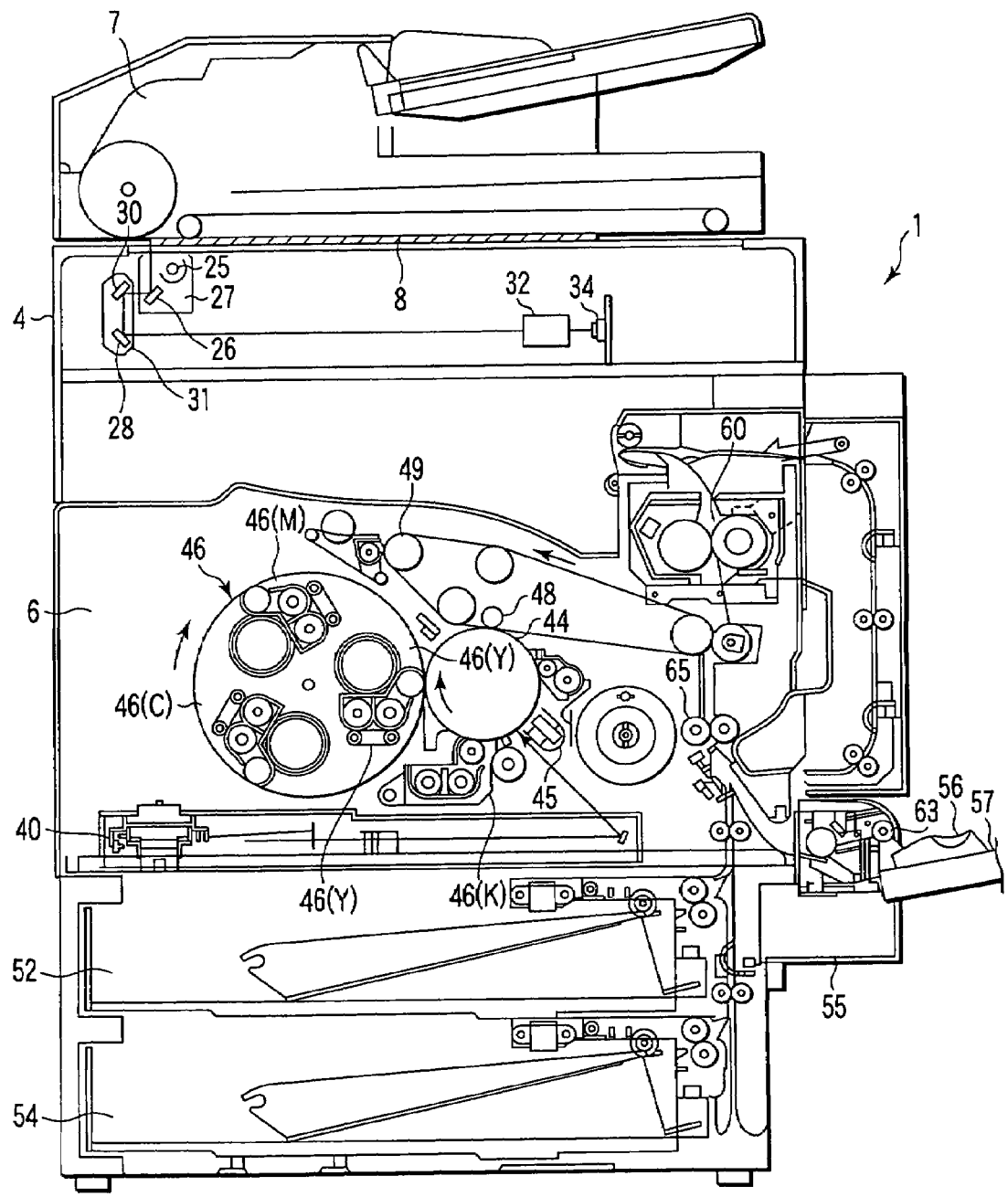
FIG. 2 is a cross sectional view showing one example of a mechanical configuration of the image forming apparatus.

FIG. 2 is a structural view for explanation of an internal structure of a color printing control unit. This image forming apparatus 1 is composed of a color scanner unit 4 serving as an image reading unit, an image forming unit (process unit) 5 for forming an output image, a printer unit 6, an automatic document feeder (hereinafter, ADF) 7, and the operating panel 80 which will be described later, etc.

The scanner unit 4 has the ADF 7 at the top portion thereof, and there is provided a transparent glass document platen 8 which is disposed so as to face the ADF 7 in a state of being closed, and on which a document is set. Below the document platen 8, an exposure lamp 25 for illuminating the document placed on the document platen 8, and a first mirror 26 for concentrating light from the exposure lamp 25 on the document and refracting the reflected light from the document, for example, to the left direction with respect to the drawing, are fixed to a first carriage 27.

The first carriage 27 is disposed so as to be movable in parallel with the document platen 8, and is made to move reciprocally below the document platen 8 by a scanning motor (not shown) via a toothed belt (not shown) or the like.

Further, below the document platen 8, a second carriage 28 which is movable in parallel with the document platen 8 is disposed. Second and third mirrors 30 and 31 which successively reflect the reflected light from the document reflected by the first mirror 26 are attached so as to be perpendicular to one another at the second carriage 28. The second carriage 28 is driven so as to be coupled with the first carriage 27 by the toothed belt that drives the first carriage 27, or the like, and is moved in parallel along the document platen 8 at a half-speed of that of the first carriage 27.

Furthermore, below the document platen 8, there are disposed an imaging lens 32 for focusing the reflected light from the third mirror 31 on the second carriage 28, and a CCD (photoelectric conversion element) 34 for receiving and photoelectrically converting the focused reflected light by the imaging lens. The imaging lens 32 is disposed so as to be movable via a driving mechanism within the plane including the optical axis of the light reflected by the third mirror 31, and forms the reflected light into an image at a desired magnification due to the image-forming lens 32 itself moving. Then, the CCD 34 photoelectrically converts the incident reflected light, and outputs an electric signal corresponding to the read document.

On the other hand, the printer unit 6 has a laser exposure device 40 serving as latent image forming means. The laser exposure device 40 has a semiconductor laser serving as a light source, a polygon mirror serving as a scanning member which continuously reflects the laser beam radiated from the semiconductor laser, a polygon motor serving as a scanning motor which drives the polygon mirror so as to be rotated at a predetermined rotation speed, and an optical system which reflects the laser beam from the polygon mirror and which guides the reflected laser beam to a photosensitive drum 44 which will be described later.

Moreover, the printer unit 6 has the freely rotatable photosensitive drum 44 which is disposed at the substantial center of the apparatus body and serves as an image carrier. The peripheral surface of the photosensitive drum 44 is exposed by the laser beam from the laser exposure device 40, and a desired electrostatic latent image is formed thereon. At the periphery of the photosensitive drum 44, there are arranged an electrifying charger 45 which electrifies the peripheral surface of the photosensitive drum 44 to a predetermined electric charge, a developing machine unit 46 which supplies a toner serving as a developer to the electrostatic latent image formed on the peripheral surface of the photosensitive drum 44 to carry out development at a desired picture image density, and a transfer charger 48 which transfers a toner image formed on the photosensitive drum 44 onto a paper.

At the lower portion of the apparatus body, an upper stage cassette 52 and a lower stage cassette 54 which can be respectively withdrawn from the apparatus body are disposed in a state of superimposing on one another. A large capacity feeder 55 is provided at the side of these cassettes, and a paper feeding cassette 57 serving as a hand feed tray 56 as well is mounted so as to be freely attachable and detachable above the large capacity feeder 55.

A resist roller pair 65 is provided at the upper stream side of the photosensitive drum 44. The resist roller pair 65 corrects an inclination of the ejected paper sheet, and matches the front end of the toner image on the photosensitive drum 44 with the front end of the paper sheet, and feeds the paper sheet to a transfer belt unit 49 at a speed which is the same as a moving speed of the peripheral surface of the photosensitive drum 44.

<Image Processing Method of Image Forming Apparatus>

Next, an image processing method of the image forming apparatus will be described in detail with reference to flowcharts.

(Operations at the Time of Copying)

Figure 3:
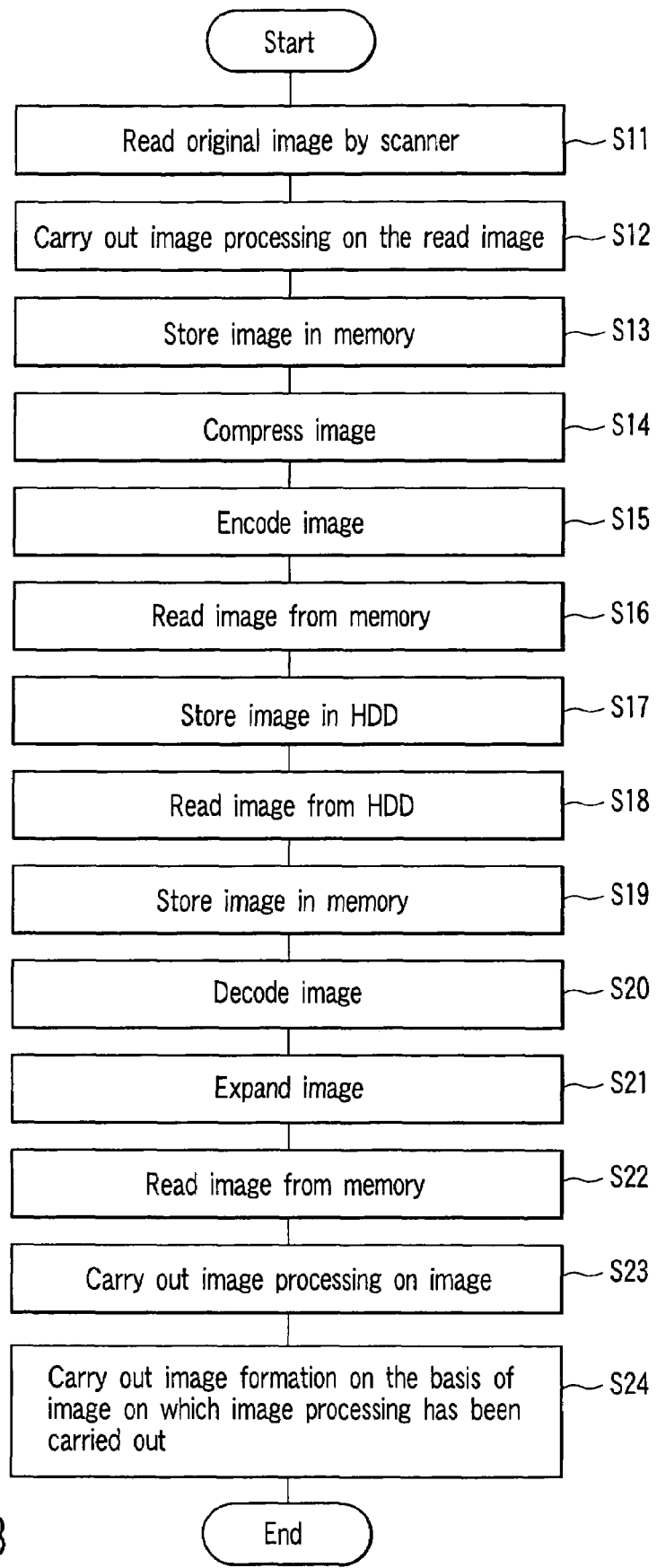
FIG. 3 is a flowchart showing one example of image processing of the image forming apparatus.

First, the operations at the time of copying of the image forming apparatus will be described in detail with reference to the flowchart of FIG. 3. At the time of copying, an image is read at scanner unit 111 (S11). Then, with respect to the read image, various corrections, filtering processing, binarizing, etc. are carried out at the image processing circuit 112 (S12). Thereafter, the processed image is transmitted to the image memory controller 105 (S13).

The image data transmitted from the image processing circuit 112 is temporarily written into a scanner buffer in the image memory 106. In parallel therewith, image data is successively read out of the scanner buffer, and compressed by the first image compression circuit in the image memory controller 105 (S14). The compressed data is transmitted to the first encoding circuit and encoded (S15), and is returned to the image memory 106 again.

Next, the encoded compressed image data is read out of the image memory 106 (S16), and is transmitted via the system controller 102 to the IDE-I/F 108 connected to a PCI bus. The hard disk drive 109 (hereinafter HDD) is connected to the IDE-I/F, and the encoded compressed image data is written and stored into the HDD (S17).

Next, the encoded compressed image data stored in the HDD 109 is read out again (S17), and is stored in the image memory 106 (S18). Then, the compressed image data is transmitted to the image memory controller 105, and the decoding thereof is performed by the internal first decoding circuit (S20). Thereafter, the image data is uncompressed by being expanded at the first image expansion circuit (S21), and the data returns to the original image data. The image data is written into the page buffer in the image memory 106.

The data written in the page buffer is read out with a timing of the printer unit (S22), and is inputted to the image processing circuit 113 via the image memory controller 105. Here, image processing such as smoothing or the like is carried out thereon (S23), and the data is transmitted to the printer unit and printed (S24). When two or more originals which are the same are outputted, the data stored in the HDD is read out again, and printed.

Normally, after the entire printing is completed, the data stored in the HDD is erased. However, when a user instructed to maintain the contents of the HDD from the operation panel 110, the data is not erased, but maintained as is.

The user can arbitrarily print the stored data by instructing from the operation panel as needed. There is described above the processing method, which uses a scanner or the like in the image forming apparatus, at the time of copying.

(Operations at the Time of Printer)

Figure 4:
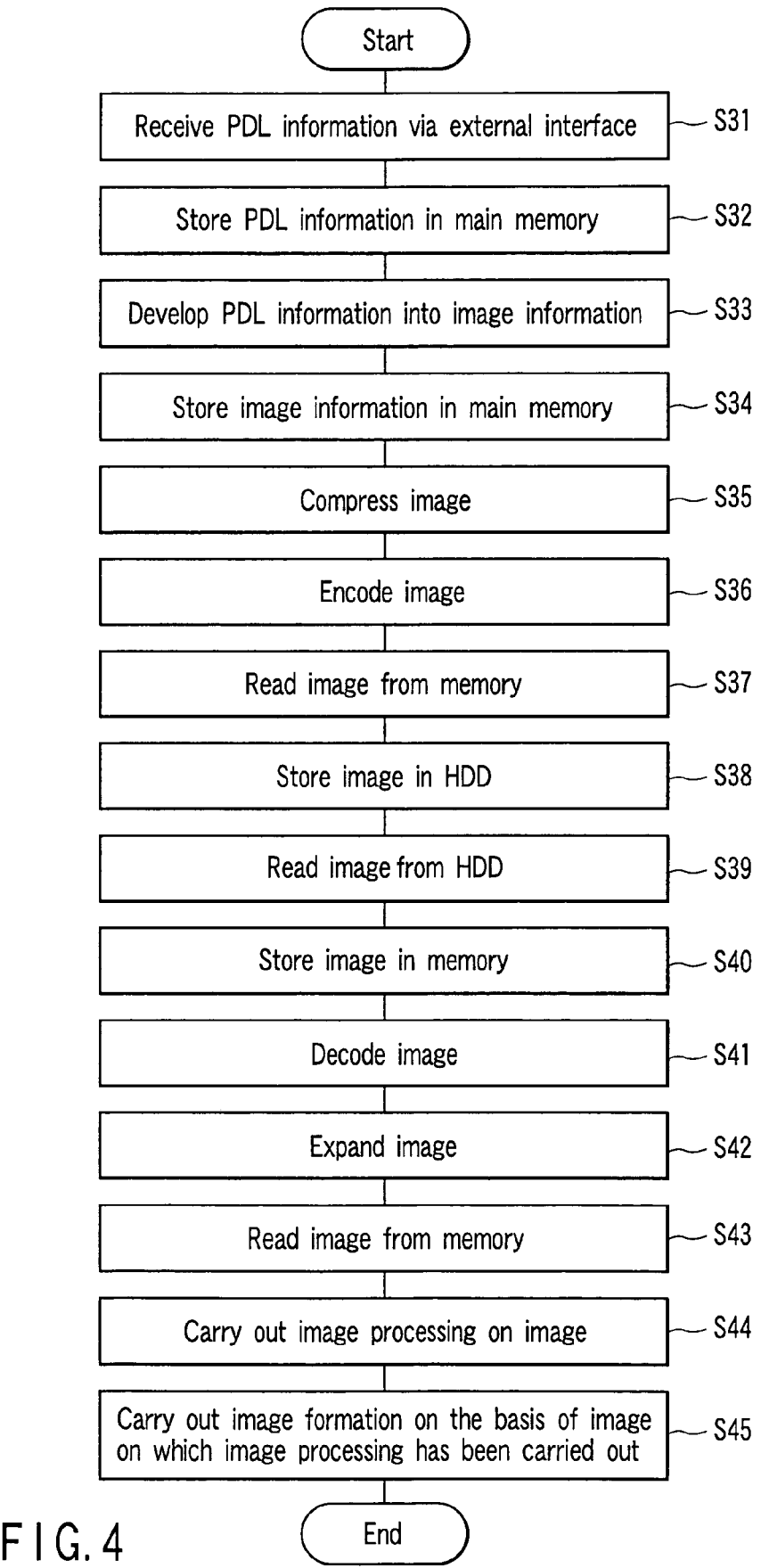
FIG. 4 is a flowchart showing another example of image processing of the image forming apparatus.

Next, the operations at the time of printing of the image forming apparatus will be described hereinafter with reference to FIG. 4. FIG. 4 is the flowchart showing another example of the image processing of the image forming apparatus. In FIG. 4, at the time of a printing operation, data described in a page description language such as Postscript, or PCL is inputted from an external device such as, mainly, a personal computer, which is connected to the external I/F 107 (S31).

At the time of a printing operation, the printing data inputted from the external I/F 107 is temporarily spooled (S32). Thereafter, the CPU 101 analyzes the page description language of the printing data, and expands it into raster image data (S33). The expanded image data is temporarily stored in the main memory (S34).

Because the image data prepared by the CPU has a large capacity, the image data is transmitted to the compression accelerator 104, and compressed by the internal second compression circuit (S35). The compressed image data is encoded by the second encoding circuit in the compression accelerator in the same way (S36). The encoded compressed image data is temporarily stored in the main memory again.

Next, the encoded compressed image data is read out of the main memory (S37), and is transmitted via the system controller 102 to the IDE-I/F 108 connected to the PCI bus. The hard disk drive 109 (hereinafter HDD) is connected to the IDE-I/F, and the encoded compressed image data is written and stored into the HDD 109 (S38).

Hereinafter, the encoded compressed image data stored in the HDD 109 is transmitted to the printer unit 114 through the same route at the time of copying.

Namely, the encoded compressed image data stored in the HDD 109 is read out by the image memory 106 via the IDE-I/F 108, the system controller 102, and the image memory controller 105 (S39, S40). Then, the encoded compressed image data is transmitted to the image memory controller 105 again, and the decoding thereof is performed by the internal first decoding circuit (S41). Thereafter, the image data is uncompressed at the first image expansion circuit (S42), and the image data returns to the original data prepared by the CPU. The image data is written into the page buffer in the image memory 106.

The data written in the page buffer is read out with a timing of the printer unit (S43), and is inputted to the image processing circuit 113 via the image memory controller 105. Here, image processing such as smoothing or the like is carried out thereon (S44), and finally, the data is transmitted to the printer unit 114 and printed (S45). Here, when two or more originals which are the same are outputted, the data stored in the HDD 109 is read out again, and printed.

Basically, after the entire printing is completed, the data stored in the HDD 109 is erased. However, when a user instructs to maintain the contents of the HDD 109 in advance at the time of instructing of printing from the external device, the data is not erased, but maintained as is. The user can instruct to merely store the image into the HDD 109 without printing. In addition, in the same way as in the case of copying, the user can arbitrarily print the data stored in the HDD 109.

(Operations when Copying and Printing are Simultaneously Requested)

Next, a case where copying and a printing operations are simultaneously requested will be described. In the image forming apparatus, because there are respectively provided the image memory controller 105 serving as the encoding-decoding and compression-expansion functions of the copying system and the system controller 102 serving as the encoding-decoding and compression-expansion functions of the printer system which are independent of each other, basically, processings on two image information can be independently processed in parallel.

However, when a copying operation and a a printing operation are simultaneously requested, as an example, there are cases in which the copying operation is given priority. This is the specification which is under consideration of the convenience of the user. The copying operation is carried out in the same way as described above. Because the printer unit 114 is occupied by the copying operation, the a printing operation is in a standby state with the encoded compressed image data stored in the HDD 109.

After the copying operation is completed, the encoded compressed image data stored in the HDD 109 for a a printing operation is transmitted to the printer unit 114 and printed by the same procedure as described already.

In the a printing operation, it takes a relative long time for the CPU 101 to analyze the page description language of the printing data, and to expand it into raster image data. In the case described above, because the CPU 101 can carry out developing work into raster image data during the copying operation, at the time of printing after the copying is completed, the image data already prepared is outputted, so that it is possible to rapidly output without the printer unit 114 being made to wait. This operation is possible because the image forming apparatus of the present invention has the respective circuits for compression and encoding of two systems independent of one another.

Further, the compression accelerator 104 processes the data on the main memory 103. On the other hand, the image memory controller 105 processes the data on the image memory 106 which the image memory controller 105 itself manages. In this way, because the compression accelerator 104 and the image memory controller 105 respectively use the separate memories, memory accessing conflicts do not arise, even in a situation in which the compression accelerator 104 and the image memory controller 105 respectively operate, so that there is no deterioration in the performance thereby.

Moreover, the compression accelerator 104 has the second decoding circuit and the second expansion circuit built-in. In a case where the compressed image data encoded and stored in the HDD 109 is edited at the CPU 101, by using these circuits, it is possible to operate at a speed higher than a case where the CPU processes by using only software. Because this operation can be operated independently of the copying operation, even when this operation is requested to be executed with the copying operation at the same time, it is possible to cope therewith without the entire performance deteriorating.

(Reading from the Exterior)

There are cases where the second decoding circuit and the second expansion circuit of the compression accelerator 104 are used for reading out the compressed image data encoded and stored in the HDD 109 on an external device such as, mainly, a personal computer, which is connected to the external I/F 107.

(Simplification of Compression Processing and Encoding Processing, and Expansion Processing and Decoding Processing)

Moreover, the compression processing and encoding processing, and the expansion processing and decoding processing which have been described above can be respectively simplified by replacing those with one-time information conversion processing. Namely, because all of the compression processing and encoding processing, and the expansion processing and decoding processing are the processings for converting information, the conversion processing of the compression unit and the conversion processing of the encoding unit are synthesized, and the image information can be converted into the encoded compressed image information by the synthesized one-time conversion processing. By carrying out such processing, it is possible to make a conversion time and memory resources.

In the same way, decoding conversion processing and expansion conversion processing of the decoding expansion unit are synthesized, and the compressed image information encoded by the encoding unit can be converted into the image information by the synthesized one-time conversion processing. Similarly, by carrying out such processing, it is possible to make a conversion time and memory resources in small scales.

Figure 5:
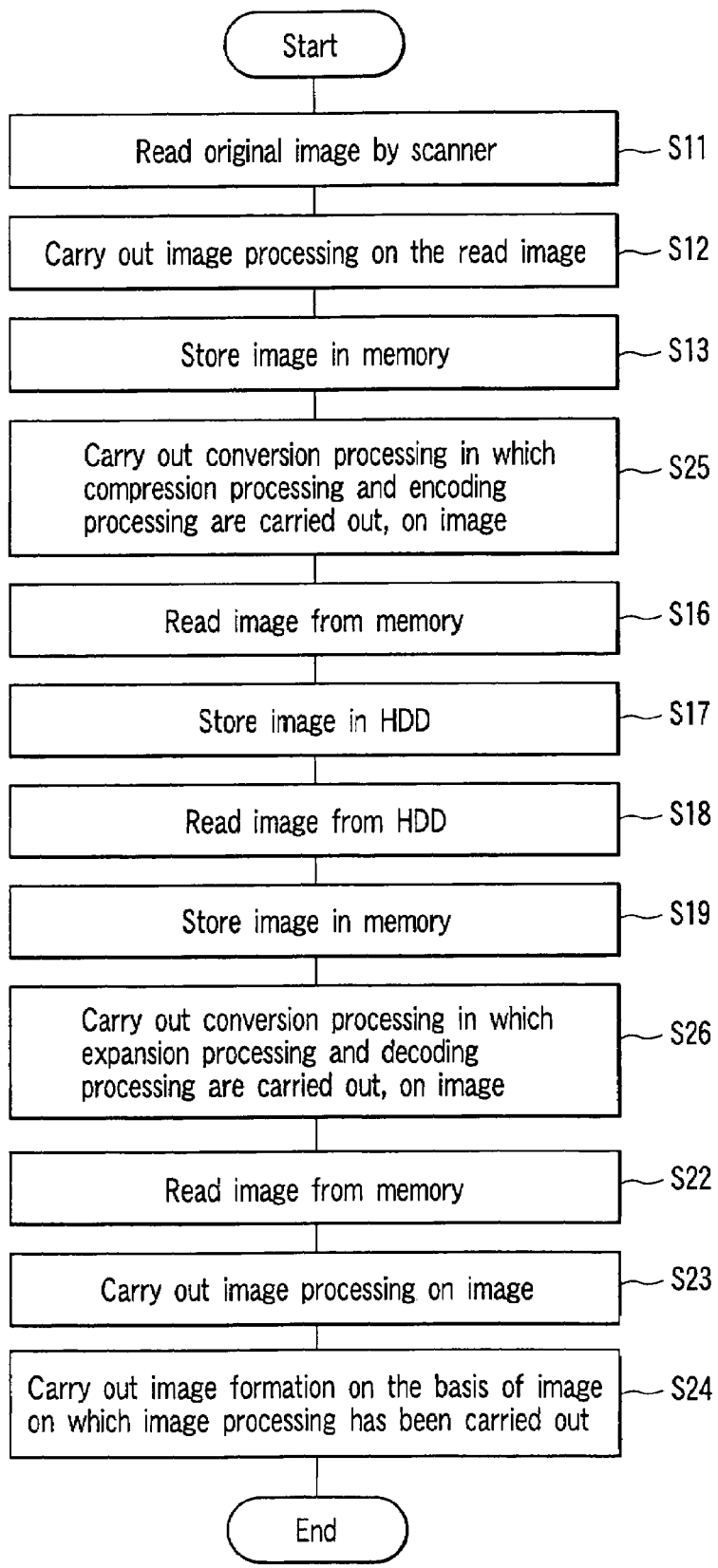
FIG. 5 is a flowchart showing even another example of image processing of the image forming apparatus.

As shown in step S25 in the flowchart of FIG. 5, such a simplification of the compression processing and encoding processing, and the expansion processing and decoding processing is possible in the encoding processing and the compression processing of the image memory controller 105. Further, as shown in step S26 in the flowchart of FIG. 5, it is possible in the decoding processing and the expansion processing of the image memory controller 105.

Figure 6:
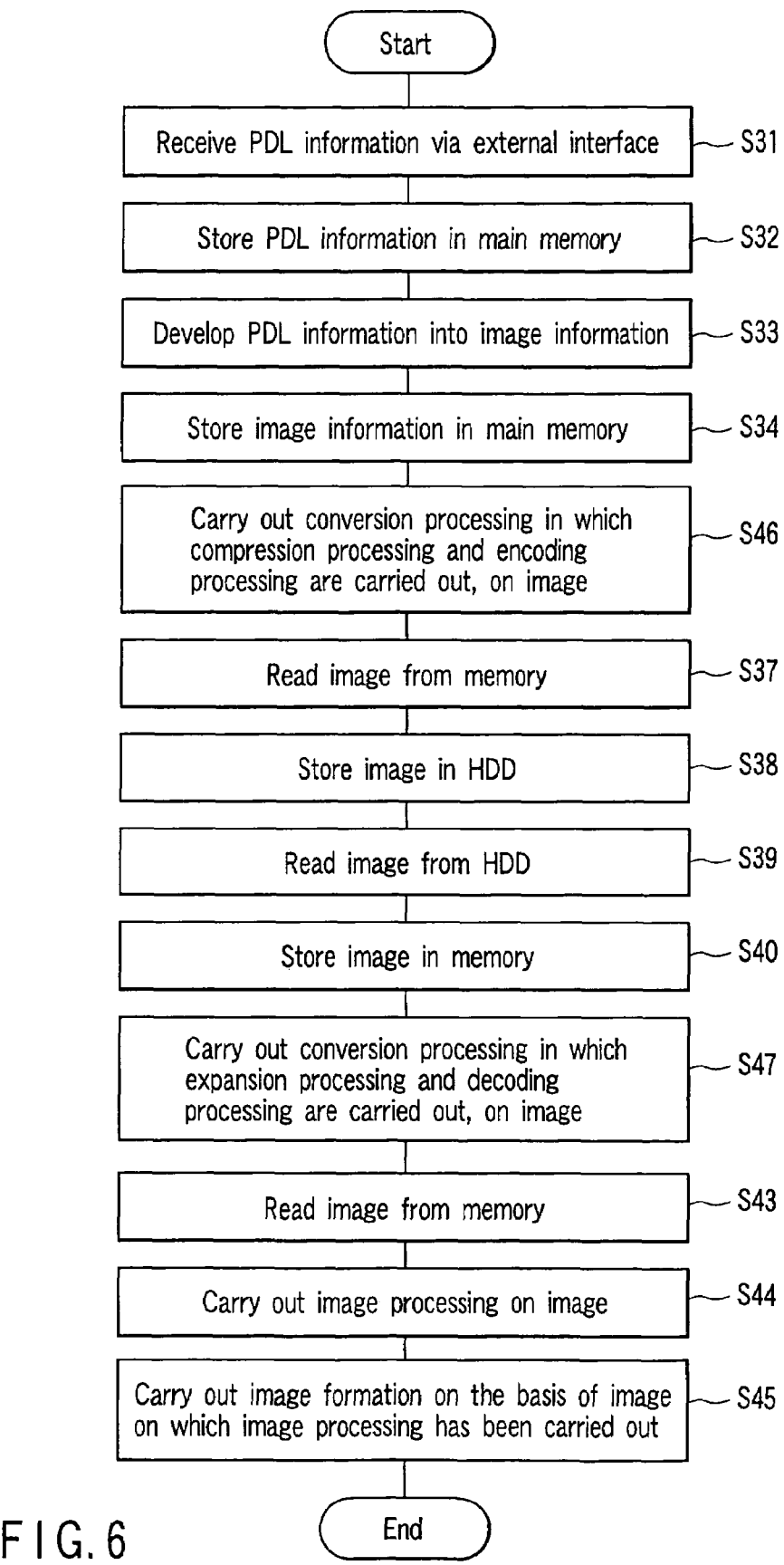
FIG. 6 is a flowchart showing other example of image processing of the image forming apparatus.

In the same way, as shown in step S46 in the flowchart of FIG. 6, such a simplification of the compression processing and encoding processing, and the expansion processing and decoding processing is possible in the encoding processing and the compression processing of the compression accelerator 104. Further, as shown in step S47 in the flowchart of FIG. 6, it is possible in the decoding processing and the expansion processing of the compression accelerator 104.

(Non-compression/Non-encoding Mode)

Moreover, in the CPU 101, which is, for example, the control unit, of the image forming apparatus, it is preferable that there is provided a non-compression/non-encoding mode in which neither the compression processing nor encoding processing onto the image information is carried out in the compression unit and the encoding unit. By selecting the non-compression/non-encoding mode from the operation panel 110 or the like, the respective units are controlled by the CPU 101 or the like so as to carry out image formation by supplying at least one of the image information on the original and the printing information in the page description language as is to the forming unit. In accordance therewith, by avoiding compression processing and encoding processing of unnecessary image information, rapid image processing can be carried out in accordance with a situation.

As described above, in the image information apparatus relating to the present invention, the independent chips of the compression processing and encoding processing, and the expansion processing and decoding processing which are independent of one another are provided in the copying system and the printer system, whereby an image of the copying system and an image of the printer system are processed at the separated encoding circuits even when a copying operation and a a printing operation are simultaneously requested. Accordingly, data can be encoded and stored in a hard disk without an increase in a processing time being brought about.

Moreover, because the data has been prepared on the hard disk, printing of another job made to wait can be started immediately after printing of a prior job is completed, and the operations can be efficiently carried out without the printer being not in use, so that the productivity is improved.

Further, because the data on the hard disk has been encoded, even if the hard disk is stolen or the hard disk is disposed as remaining the data by some rare accident, there is little possibility of leaking of confidential information. Accordingly, in accordance with the image forming apparatus of the present invention, a multifunction device having a high productivity can be realized while ensuring the safety of data.

In accordance with various embodiments described above, the skilled in the art can realize the present invention. However, it is easy for those skilled in the art to further conceive of various modified examples of these embodiments, and the present invention can be applied to various embodiments without inventive ability. Accordingly, the present invention extends over a broad range which does not contradict the disclosed principles and the novel features, and is not limited to the embodiments described above.

What is claimed is:

1. An image forming apparatus comprising:
    a reading unit which reads image information on an original;
    a first compression unit which compresses the image information read by the reading unit into compressed image information;
    a first encoding unit which encodes the compressed image information;
    an interface unit which acquires printing information in a page description language from exterior;
    a generating unit which generates printing image information on the basis of the printing information;
    a second compression unit which compresses the printing image information into compressed printing image information;
    a second encoding unit which encodes the compressed printing image information;
    a decoding unit which decodes the encoded compressed image information and the encoded compressed printing image information, and which outputs the compressed image information and the compressed printing image information;
    an expansion unit which expands the compressed image information and the compressed printing image information decoded by the decoding unit; and a forming unit which forms an image onto a recording medium on the basis of the image information and the printing image information expanded by the expansion unit.

2. An image forming apparatus according to claim 1, wherein the first compression unit, the first encoding unit, the decoding unit, and the expansion unit are provided in one chip.

3. An image forming apparatus according to claim 1, wherein the conversion processing of the first compression unit and the conversion processing of the first encoding unit are synchronized, and due to the synchronized one-time conversion processing, the image information read by the reading unit is converted into the encoded compressed image information.

4. An image forming apparatus according to claim 1, wherein the encoding conversion processing and the expansion conversion processing of the first decoding expansion unit are synchronized, and due to the synchronized one-time conversion processing, the compressed image information encoded by the first encoding unit is converted into the image information.

5. An image forming apparatus according to claim 1, wherein the conversion processing of the second compression unit and the conversion processing of the second encoding unit are synchronized, and due to the synchronized one-time conversion processing, the printing image information generated by the generating unit is converted into the encoded compressed printing image information.

6. An image forming apparatus according to claim 1, further comprising:
a control unit which provides a non-compression/non-encoding mode in which the first or second compression unit and the first or second encoding unit do not carry out any of compression processing and encoding processing, and when it is selected, controls so as to carry out image formation by supplying at least one of the image information on the original and the printing information in the page description language as is to the forming unit.

7. An image forming apparatus comprising:
a reading unit which reads image information on an original;
a first compression encoding unit provided in a first semiconductor chip, which compresses and encodes the image information read by the reading unit into compressed image information;
an interface unit which acquires printing information in a page description language from exterior;
a generating unit which generates printing image information on the basis of the printing information;
a second compression encoding unit provided in a second semiconductor chip, which compresses and encodes the printing image information into compressed printing image information;
a decoding expansion unit provided in the first semiconductor chip, which decodes and expands the encoded compressed image information; and
a forming unit which forms an image onto a recording medium on the basis of the image information and the printing image information which have been decoded and expanded by the decoding expansion unit.

8. An image forming method comprising:
reading image information on an original;
compressing the read image information into compressed image information;
encoding the compressed image information;
acquiring printing information in a page description language from exterior;
generating printing image information on the basis of the printing information;
compressing the printing image information into compressed printing image information;
encoding the compressed printing image information;
decoding and expanding the encoded compressed image information and the encoded compressed printing image information; and
forming an image onto a recording medium on the basis of the image information and the printing image information which have been decoded and expanded.

9. An image forming method according to claim 8, wherein the compressing, the encoding, the decoding, and the expanding of the image information on the original are carried out in one chip.

10. An image forming method according to claim 8, wherein the conversion processing of the compressing and the conversion processing of the encoding of the image information on the original are synchronized, and due to the synchronized one-time conversion processing, the image information is converted into the encoded compressed image information.

11. An image forming method according to claim 8, wherein the encoding conversion processing and the expansion conversion processing of the encoding and expanding of the compressed image information are synchronized, and due to the synchronized one-time conversion processing, the compressed image information is converted into the image information.

12. An image forming method according to claim 8, wherein the conversion processing of the compressing and the conversion processing of the encoding of the printing image information in the page description language are synchronized, and due to the synchronized one-time conversion processing, the printing image information is converted into the encoded compressed printing image information.

13. An image forming method according to claim 8, further comprising:
providing a non-compression/non-encoding mode in which any of the compression processing and the encoding processing are not carried out, and when it is selected, carrying out image formation onto the original on the basis of at least one of the image information on the original and the printing information in the page description language.

* * * * *